US009185541B1

(12) United States Patent
Hannigan et al.

(10) Patent No.: US 9,185,541 B1
(45) Date of Patent: Nov. 10, 2015

(54) DATA USAGE MEASUREMENT OVER MULTIPLE NETWORKS

(71) Applicant: Sprint Spectrum LP, Overland Park, KS (US)

(72) Inventors: Michael Hannigan, Falls Church, VA (US); Moshe Stoler, Gaithersburg, MD (US); Ramesh Kalathur, Fairfax, VA (US); Diego Estrella Chavez, Herndon, VA (US)

(73) Assignee: Sprint Spectrum L.P., Overland Park, KS (US)

(*) Notice: Subject to any disclaimer, the term of this patent is extended or adjusted under 35 U.S.C. 154(b) by 75 days.

(21) Appl. No.: 13/829,104

(22) Filed: Mar. 14, 2013

(51) Int. Cl.
*H04W 4/26* (2009.01)

(52) U.S. Cl.
CPC ........................................ *H04W 4/26* (2013.01)

(58) Field of Classification Search
CPC ..... H04M 2215/32; H04W 4/24; H04W 4/26; H04W 36/14; H04W 36/34
USPC ................................................... 455/405, 436
See application file for complete search history.

(56) References Cited

U.S. PATENT DOCUMENTS

| 2002/0052754 | A1* | 5/2002 | Joyce et al. ...................... 705/1 |
| 2005/0003798 | A1* | 1/2005 | Jones et al. .................... 455/410 |
| 2009/0238090 | A1 | 9/2009 | Sambhwani et al. |
| 2012/0276910 | A1* | 11/2012 | Zhang ........................... 455/439 |
| 2014/0287726 | A1* | 9/2014 | Jang et al. ..................... 455/411 |

* cited by examiner

*Primary Examiner* — Marcos Torres

(57) ABSTRACT

Systems and methods of determining wireless data usage are provided. Wireless data usage of a wireless device on a first network of a first network operator is determined. A message indicating a performance of a handover of the wireless device from the first network to a second network of a second network operator is received and the wireless data usage of the wireless device on the second network is determined based on the message received.

20 Claims, 8 Drawing Sheets

DATA USAGE MEASUREMENT OVER MULTIPLE NETWORKS

TECHNICAL BACKGROUND

Wireless network operators provide access to allow wireless devices to communicate over a network. After the wireless device is authorized, the wireless device can transmit and receive information over the network. Network operators monitor data usage of the wireless device over the network for various purposes such as resource management, load balancing, billing, etc. Typically, when a wireless device changes location in the network, a location update procedure is initiated. During the location update procedure, if the wireless device has moved to a cell not included in a predetermined list of tracking areas, a tracking area update request is sent by the wireless device to the network to initiate the new tracking area procedure.

OVERVIEW

Systems and methods of determining wireless data usage are provided. Wireless data usage of a wireless device on a first network of a first network operator is determined. A message indicating a performance of a handover of the wireless device from the first network to a second network of a second network operator is received and the wireless data usage of the wireless device on the second network is determined based on the message received.

DETAILED DESCRIPTION

Figure 1:
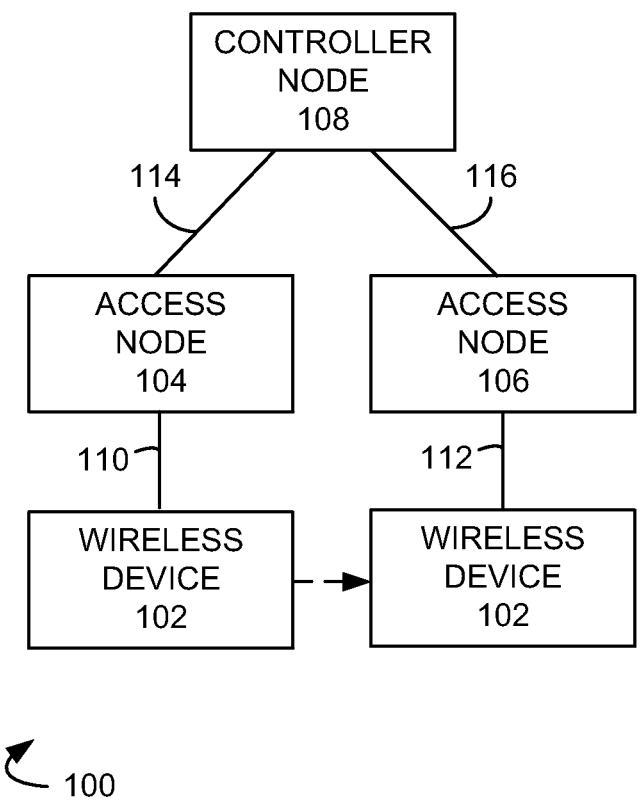
FIG. 1 illustrates an exemplary communication system to determine wireless data usage.

FIG. 1 illustrates an exemplary communication system 100 to determine wireless data usage comprising a wireless device 102, access node 104 of a first network operator, access node 106 of a second network operator, and controller node 108 of the first network operator. Other network elements may be present in the communication system 100 to facilitate communication but are omitted for clarity, such as gateways, routers, mobile switching centers, and location registers such as a home location register or visitor location register.

Wireless device 102 can be any device capable of communicating over a network using a wireless interface. For example, wireless device 102 can include a cell phone, a smart phone, a computing platform such as a laptop, palmtop, or a tablet, a personal digital assistant, or an internet access device, and combinations thereof.

Wireless device 102 is in communication with access node 104 through communication link 110 and in communication with access node 106 through communication link 112. Links 110 and 112 can use various communication media, such as air, space, metal, optical fiber, or some other signal propagation path—including combinations thereof. Communication links 110 and 112 may comprise many different signals sharing the same link. Communication links 110 and 112 could include multiple signals operating in a single "airpath" comprising beacon signals, user communications, communication sessions, overhead communications, frequencies, timeslots, transportation ports, logical transportation links, network sockets, packets, or communication directions. For example, user communications between wireless device 102 and access node 104 could share the same representative wireless link 110, but be transferred over different communication sessions, frequencies, timeslots, packets, ports, sockets, logical transport links, or in different directions— including combinations thereof.

Access nodes 104 and 106 can be any network node configured to communicate with wireless device 102 and controller node 108. For example, access nodes 104 and 106 can be a base transceiver station, a radio base station, an eNodeB device, or an enhanced eNodeB device. Access node 104 can be associated with a first network operator and access node 106 can be associated with a second network operator.

Access node 104 is in communication with controller node 108 of a first network operator through communication link 114 and access node 106 is in communication with controller node 108 of the first network operator through communication link 116. Communication links 114 and 116 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Links 114 and 116 can be a direct link or might include various equipment, intermediate components, systems, and networks. Links 114 and 116 can include multiple signals operating in a single pathway in a similar manner as wireless links 110 and 112.

As illustrated in FIG. 1, wireless device 102 can be in communication with more than one access node. In addition to different network operators, the plurality of access nodes can be associated with different types of networks. For example, different network types can support different voice call protocols and/or different types of voice calls. Alternatively, a first network can support packet switched telephone network calls and a second network can support voice over internet protocol (VoIP) calls. The plurality of access nodes can also comprise a variety of devices, for example, a first access node can be a base station of a wireless communication network, and a second access node can be a wired or wireless access point of a data network. Other examples and combinations are also possible.

Controller node 108 is a network element of the first network of a first network operator that can communicate with access node 104 of the first network and access node 106 of the second network. Controller node 108 can also communicate over a communication network (not illustrated). Controller node 108 is associated with a first network and operated by a first network operator. The first network operator is different from the second network operator.

A network operator can be a communications provider that provides access to a network where communications are transmitted over the network. Typically, a network operator owns and operates the nodes within the network. However, a network operator may enter into relationships with other network operators to share resources such as frequency bands, network environments, etc. For example, multiple network providers may operate in a multi-operator core network environment, and may enter into agreements to share frequency bands or other network resources. Sharing agreements may be limited in scope, and network providers may share resources of the network while not sharing other resources of the network. For example, one network provider may share one frequency band with a second network provider while not sharing resources of another frequency band.

Controller node 108 can be a standalone computing device, computing system, or network component, and can be accessible, for example, by a wired or wireless connection, or through an indirect connection such as through a computer network or communication network. For example, controller node 108 can include a mobility management entity (MME), a serving gateway (SGW), a public data network gateway (PGW) and/or an accounting node.

Controller node 108 can comprise a processor and associated circuitry to execute or direct the execution of computer-readable instructions to obtain information. Controller node 108 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 108 can receive instructions and other input at a user interface.

Generally, the present disclosure relates to a system and method of determining data usage of a wireless device. When the wireless device is communicating over a first network of a first network operator, data usage can be determined based on the information communicated to and from the wireless device over the first network. A handover procedure can be performed from the first network to a second network of a second network operator. A message can be received at a controller node indicating that a handover has been performed from the first network to the second network. The message can be indicative of the wireless device entering a network of a different network operator at the same frequency band of the previous network operator or entering a network of a different network operator at a different frequency band. The message can have any format. For example, the message can include only change of network information or the message can include other information. In an exemplary embodiment, the message can include a public land mobile network identifier (PLMN-ID) generated by the wireless device or an E-UTRAN cell global identifier (ECGI) generated by the access node. Data usage can be determined using an accounting node including any accounting platform that may utilize Diameter or RADIUS protocol. Data usage determination can be initiated by using an accounting message sent to the accounting node from the controller node in response to the change in network message.

Figure 2:
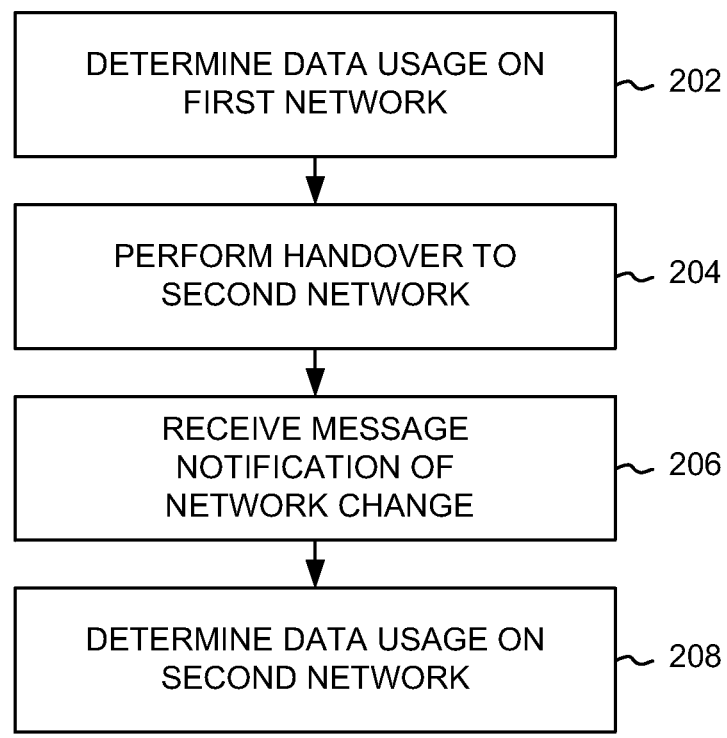
FIG. 2 illustrates an exemplary method of determining wireless data usage.

FIG. 2 illustrates a flow chart of an exemplary method of determining wireless data usage. The method will be discussed with reference to the exemplary communication system 100 illustrated in FIG. 1. However, the method can be implemented with any suitable communication system. In addition, although FIG. 2 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined and/or adapted in various ways.

A wireless device 102 communicates information over a first network, for example between access node 104 and controller node 108. The data transmitted and received by the wireless device 102 can be determined at 202. The data usage of the wireless device over the first network can be determined in various ways. For example, controller node 108 can monitor the number of bits of data communicated to and from the wireless device over the first network.

Communication system 100 can perform a handover of the wireless device 102 from the access node 104 of the first network to access node 106 of the second network at 204. The handover can be initiated by any device in the system 100. For example, the wireless device 102, access node 104, access node 106, and/or controller node 108 can initiate the handover from the first network to the second network. In one embodiment, the handover can be performed between the wireless device 102 and the access node 104 where access node 104 communicates with access node 106 of the second network to perform the handover.

After a handover of the wireless device 102 from a first network to a second network has been performed, a message indicative of a network change can be received by controller node 108 at 206. The message can act as a trigger to suspend data usage determination or to begin data usage determination of the wireless device 102. For example, the change in network message can trigger additional accounting messages such as start, stop, and/or interim messages. For instance, a message indicative of a start time can be used to trigger a data usage determination session. A stop time message can terminate the data usage determination session. An interim message can be indicative of maintaining the current data determination state such that if data determination is currently occurring, it will continue to be determined. Likewise, if no data determination is being determined than data usage determination will not be initiated.

The change in network message can be generated by the wireless device 102 or access nodes 104 and/or 106. For example, when a handover is performed from the first network to the second network, a message can be generated at the wireless device 102 and communicated to the controller node 108 of the first network through the access node 104 and/or 106 to indicate that the wireless device 102 is no longer communicating over the first network of the first network operator. In an alternative example, the message can be generated at the access node 104 and/or 106 and communicated to the controller node 108 to indicate that the wireless device 102 has begun to communicate over the second network.

The message can include information associated with the first network and/or the second network. For example, the message can include unique identifiers to allow the controller node 108 to determine various attributes of the wireless device 102 such as location, original network operator, current network operator, original frequency band, current frequency band, etc. In addition, the message can comprise a public land mobile network identifier (PLMN-ID) or an E-UTRAN cell global identifier (ECGI).

The message indicative of a network change can be sent separately from any tracking area update procedure. Tracking area updates may not be reliable for determining changes in data usage from one network to another because the tracking area update procedure may not contemplate all transitions that occur between one network to another. A handover of the wireless device can be performed such that the wireless device changes networks without changing tracking areas. Likewise, a handover between frequency bands of different network operators can be performed without changing tracking areas.

After controller node 108 receives the message, a determination of the data usage of the wireless device 102 on the second network can be initiated at 208. In an embodiment, the controller node 108 can monitor and determine the data usage in each network. Alternatively, a separate device can determine the data usage in combination with the controller node 108 such as an accounting node. When a separate device is used in combination with the controller node 108 to determine the data usage, the controller node 108 can generate an accounting message such as a start, stop, and/or interim message to initiate data usage determination after receiving the change in network message.

The data usage can be determined in various ways using various factors. For example, data usage determination can comprise a session start time, a session stop time, session duration, and/or the number of bits and/or packets transferred over the network to and/or from the wireless device. When start time, stop time, and interim messages are used during data usage determination, a message indicative of a start time can be used to trigger a data usage determination session. The data usage determination session can include data usage over the first network and the second network. A stop time message can terminate the data usage determination session. An interim message can be indicative of the wireless device being handed over from a first network to a second network, where the interim message can indicate a discontinuation of data determination over the first network and an initiation of data determination over the second network and/or a the wireless device being handed over from the second network to the first network. The wireless device can be transferred between the first network and the second network numerous times before a stop time message is received to terminate the data usage determination session.

Figure 3:
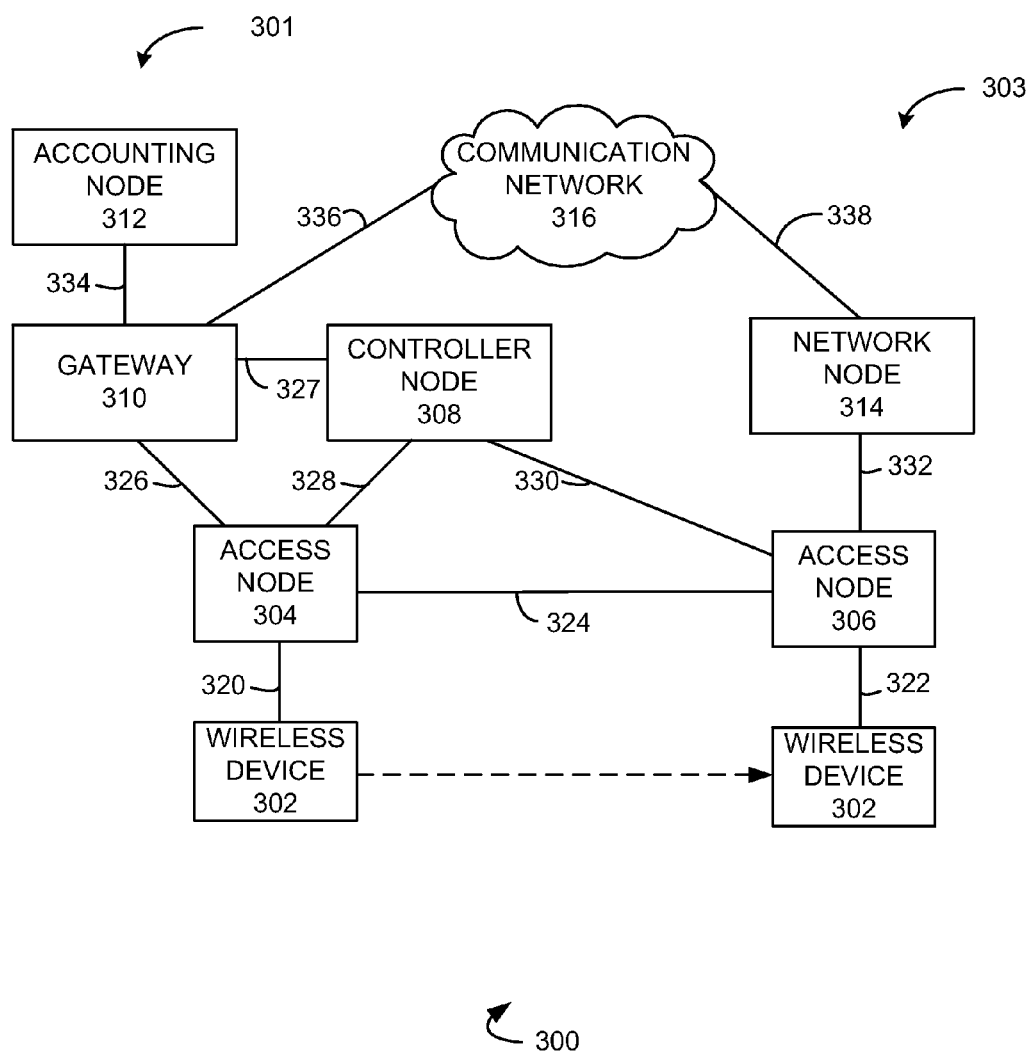
FIG. 3 illustrates another exemplary communication system to determine wireless data usage.

FIG. 3 illustrates another exemplary communication system to determine wireless data usage. Communication system 300 comprises a wireless device 302, access node 304 of a first network 301 of a first network operator, access node 306 of a second network 303 of a second network operator, a controller node 308 of a first network, a gateway 310 of a first network, an accounting node 312 of a first network, a network node 314 of the second network, and a communication network 316. Other network elements may be present in the communication system 300 to facilitate communication but are omitted for clarity, such as routers, mobile switching centers, and location registers such as a home location register or visitor location register.

Wireless device 302 can be any device capable of communicating over a network using a wireless interface. For example, wireless device 302 can include a cell phone, a smart phone, a computing platform such as a laptop, palmtop, or a tablet, a personal digital assistant, or an internet access device, and combinations thereof.

Wireless device 302 can communicate with access node 304 over a first network 301 of a first network operator through communication link 320. Wireless device 302 can communicate with access node 306 over a second network 303 of a second network operator through communication link 322. Links 320 and 322 can use various communication media, such as air, space, metal, optical fiber, or some other signal propagation path—including combinations thereof. Communication links 320 and 322 may comprise many different signals sharing the same link. Communication links 320 and 322 could include multiple signals operating in a single "airpath" comprising beacon signals, user communications, communication sessions, overhead communications, frequencies, timeslots, transportation ports, logical transportation links, network sockets, packets, or communication directions. For example, user communications between wireless device 302 and access node 304 could share the same representative wireless link 320, but be transferred over different communication sessions, frequencies, timeslots, packets, ports, sockets, logical transport links, or in different directions—including combinations thereof.

Access nodes 304 and 306 can be any network node configured to communicate with wireless device 302 over the first network 301 and the second network 303, respectively. For example, access nodes 304 and 306 can be a base transceiver station, a radio base station, an eNodeB device, or an enhanced eNodeB device.

Access node 304 of the first network 301 can be in communication with access node 306 of the second network 303 through communication link 324, controller node 308 of a first network 301 through communication link 328, and gateway 310 of the first network 301 through communication link 326. Accounting node 312 is in communication with gateway 310 through communication link 334. Gateway 310 is in communication with controller node 308 through communication link 327. Access node 306 is in communication with controller node 308 through communication link 330 and network node 314 through communication link 332. Network node 314 is in communication with the communication network 316 through communication link 338 and gateway 310 is in communication with communication network 316 through communication link 336.

Communication links 324, 326, 327, 328, 330, 332, 334, 336, and 338 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Links 324, 326, 327, 328, 330, 332, 334, 336, and 338 can be a direct link or might include various equipment, intermediate components, systems, and networks. Links 324, 326, 327, 328, 330, 332, 334, 336, and 338 can include multiple signals operating in a single pathway in a similar manner as wireless links 320 and 322. While communication links are illustrated as shown, any of the network elements can be in communication with any other network element through any communication link.

As illustrated in FIG. 3, wireless device 302 can be in communication with more than one access node. Access nodes 304 and 306 can be associated with different network operators and different types of networks, for example, supporting different voice call protocols and/or different types of voice calls. For example, a first network can support packet switched telephone network calls and a second network can support voice over internet protocol (VoIP) calls. The plurality of access nodes can also comprise a variety of devices, for example, a first access node can be a base station of a wireless communication network, and a second access node can be a wired or wireless access point of a data network. Other examples and combinations are also possible.

A network operator can be a communications provider that provides access to a network where communications are transmitted over the network. Typically, a network operator owns and operates the nodes within the network. However, a network operator may enter into relationships with other network operators to share resources such as frequency bands, network environments, etc. For example, multiple network providers may operate in a multi-operator core network environment, and may enter into agreements to share frequency bands or other network resources. Sharing agreements may be limited in scope, and network providers may share resources of the network while not sharing other resources of the network. For example, one network provider may share one frequency band with a second network provider while not sharing resources of another frequency band.

A first communication network 301 can be operated by a first network operator and comprise access node 304, controller node 308, gateway 310, and accounting node 312. A second communication network 303 can be operated by a second network operator, different from a first network operator and comprise access node 306 and network node 314. Network node 314 can be any network device capable of communicating in network 303. For example, network node 314 can include any combinations of gateways, MMEs, HHSs, accounting nodes, etc.

Controller node 308 can be a standalone computing device, computing system, or network component, and can be accessible, for example, by a wired or wireless connection, or through an indirect connection such as through a computer network or communication network. For example, controller node 308 can include a MME, and a HHS.

Gateway 310 can be any device configured to interface with other network devices using various protocols. For example, gateways 310 can comprise a serving gateway (SGW), and/or a public data network gateway (PGW).

Accounting node 312 can be any device that determines the amount of data usage of the wireless device 302. For instance, the accounting node 312 can be an Amdocs platform that communicates using a Diameter protocol. In an exemplary embodiment, the accounting node 312 can determine data usage of wireless device 302 over the first network 301 and the second network 303. One way data usage can be determined includes monitoring the number of bits transmitted to and from the wireless device over the first network 301 and the second network 303. Data usage information can be used for numerous purposes such as resource management, load balancing, billing, etc.

Controller node 308 can also act in conjunction with accounting node 312 to determine data usage. Controller node 308 can generate an accounting message in response to receiving the change in network message. For example, after receiving the change in network message, the controller node 308 can generate a start, stop, and/or interim message and send the accounting message to accounting node 312. When start time, stop time, and interim messages are used during data usage determination, a message indicative of a start time can be used to trigger a data usage determination session. The data usage determination session can include data usage over the first network and the second network. A stop time message can terminate the data usage determination session. An interim message can be indicative of the wireless device being handed over from a first network to a second network, where the interim message can indicate a discontinuation of data determination over the first network and an initiation of data determination over the second network and/or a the wireless device being handed over from the second network to the first network. The wireless device can be transferred between the first network and the second network numerous times before a stop time message is received to terminate the data usage determination session.

Controller node 308, gateway 310, and/or accounting node 312 can comprise a processor and associated circuitry to execute or direct the execution of computer-readable instructions to obtain information. Controller node 308, gateway 310, and/or accounting node 312 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 308, gateway 310, and/or accounting node 312 can receive instructions and other input at a user interface.

Figure 4:
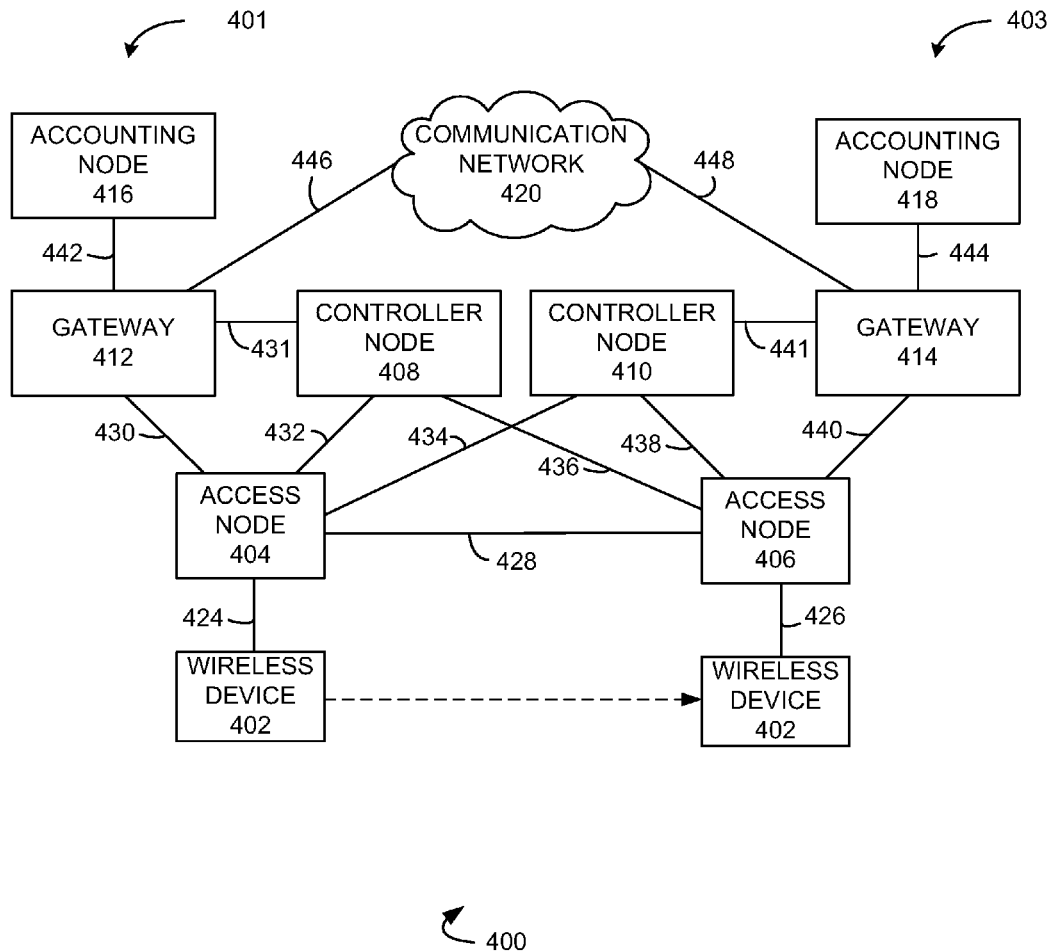
FIG. 4 illustrates another exemplary communication system to determine wireless data usage.

FIG. 4 illustrates another exemplary communication system to determine wireless data usage. Communication system 400 comprises a wireless device 402 capable of communicating over a first network 401 of a first network operator and a second network 403 of a second network operator. The first network comprises access node 404, controller node 408, gateway 412, and an accounting node 416. The second network 403 of the second network operator comprises an access node 406, a controller node 410, gateway 414, and accounting node 418. The first network 401 and the second network 403 can communicate with communication network 420.

Wireless device 402 can be any device capable of communicating over a network using a wireless interface. For example, wireless device 402 can include a cell phone, a smart phone, a computing platform such as a laptop, palmtop, or a tablet, a personal digital assistant, or an internet access device, and combinations thereof.

Wireless device 402 can communicate over the first network 401 of a first network operator through communication link 424 and over the second network 403 of a second network operator through communication link 426. Links 424 and 426 can use various communication media, such as air, space, metal, optical fiber, or some other signal propagation path—including combinations thereof. Communication links 424 and 426 may comprise many different signals sharing the same link. Communication links 424 and 426 could include multiple signals operating in a single "airpath" comprising beacon signals, user communications, communication sessions, overhead communications, frequencies, timeslots, transportation ports, logical transportation links, network sockets, packets, or communication directions. For example, user communications between wireless device 402 and access node 404 could share the same representative wireless link 424, but be transferred over different communication sessions, frequencies, timeslots, packets, ports, sockets, logical transport links, or in different directions—including combinations thereof.

Access nodes 404 and 406 can be any network node configured to communicate with wireless device 402 over the first network 401 and the second network 403, respectively. For example, access nodes 404 and 406 can be a base transceiver station, a radio base station, an eNodeB device, or an enhanced eNodeB device.

In the first network 401, access node 404 is in communication with access node 406 through communication link 428, gateway 412 through communication link 430, controller node 408 through communication link 432, and controller node 410 of the second network 403 through communication link 434. Gateway 412 is in communication with controller node 408 through communication link 431, accounting node 416 through communication link 442, and communication network 420 through communication link 446.

In the second network 403, access node 406 is in communication with access node 404 through communication link 428, gateway 414 through communication link 440, controller node 410 through communication link 438, and controller node 408 of the first network 401 through communication link 436. Gateway 414 is in communication with controller node 410 through communication link 441, accounting node 418 through communication link 444, and communication network 420 through communication link 448.

Communication links 428, 430, 431, 432, 434, 436, 438, 440, 441, 442, 444, 446, and 448 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Links 428, 430, 431, 432, 434, 436, 438, 440, 441, 442, 444, 446, and 448 can be a direct link or might include various equipment, intermediate components, systems, and networks. Links 428, 430, 431, 432, 434, 436, 438, 440, 441, 442, 444, 446, and 448 can include multiple signals operating in a single pathway in a similar manner as wireless links 424 and 426. While communication links are illustrated as shown, any of the network elements can be in communication with any other network element through any communication link.

As illustrated in FIG. 4, wireless device 402 can be in communication with more than one access node. Access nodes 404 and 406 can be associated with different network operators and different types of networks, for example, supporting different voice call protocols and/or different types of voice calls. For example, a first network can support packet switched telephone network calls and a second network can support voice over internet protocol (VoIP) calls. The plurality of access nodes can also comprise a variety of devices, for example, a first access node can be a base station of a wireless communication network, and a second access node can be a wired or wireless access point of a data network. Other examples and combinations are also possible.

A network operator can be a communications provider that provides access to a network where communications are transmitted over the network. Typically, a network operator owns and operates the nodes within the network. However, a network operator may enter into relationships with other network operators to share resources such as frequency bands, network environments, etc. For example, multiple network providers may operate in a multi-operator core network environment, and may enter into agreements to share frequency bands or other network resources. Sharing agreements may be limited in scope, and network providers may share resources of the network while not sharing other resources of the network. For example, one network provider may share one frequency band with a second network provider while not sharing resources of another frequency band.

A network indication message can be generated at a wireless device 402 and/or access nodes 404 and/or 406 to be communicated to controller node 408 and/or 410. For example, when wireless device 402 is in communication with access node 404 and is communicating over the first network 401, a network indication message, such as a PLMN-ID message, can be generated by the wireless device 402 and sent to the controller node 408 to identify that wireless device 402 is communicating over the first network 401. Alternatively, access node 404 and/or 406 can generate the network indication message. When a handover from the first network 401 to the second network 403 is performed, wireless device 402 can generate a network indication message, such as an ECGI message, to be sent to controller node 408 indicating that the wireless device 402 is no longer communicating over the first network 401 and/or a network indication message can be communicated to controller node 410 indicating that wireless device 402 is now communicating over the second network 403. Likewise, when a handover is performed from access node 406 of the second network 403 to access node 404 of the first network 401, a network indication message can be communicated to controller node 410 indicating that wireless device 402 is no longer communicating over the second network 403 and/or a network indication message can be communicated to controller node 408 indicating that wireless device 402 is now communicating over the first network 401.

The network indication message can trigger an accounting message to initiate data usage determination. For example, the controller node 408 and/or 410 can generate an accounting message to accounting node 416 and/or 418, where the accounting message can be communicated through gateways 412 and/or 414. For example, an accounting message can be a start, stop, and/or interim message after receiving the network indication message. When start time, stop time, and interim messages are used during data usage determination, a message indicative of a start time can be used to trigger a data usage determination session. The data usage determination session can include data usage over the first network and the second network. A stop time message can terminate the data usage determination session. An interim message can be indicative of the wireless device being handed over from a first network to a second network, where the interim message can indicate a discontinuation of data determination over the first network and an initiation of data determination over the second network and/or a the wireless device being handed over from the second network to the first network. The wireless device can be transferred between the first network and the second network numerous times before a stop time message is received to terminate the data usage determination session Controller nodes 408 and 410 can be a standalone computing devices, computing systems, or network components, and can be accessible, for example, by a wired or wireless connection, or through an indirect connection such as through a computer network or communication network. For example, controller nodes 408 and 410 can include a mobility management entity (MME) and a home subscriber server (HHS).

Gateways 412 and 414 can be any device configured to interface with other network devices using various protocols. For example, gateways 412 and 414 can comprise a serving gateway (SGW), and/or a public data network gateway (PGW).

Accounting nodes 416 and 418 can be any device that determines the amount of data usage of the wireless device 402 over the first and/or second network. For instance, the accounting nodes 416 and 418 can be Amdocs platforms that communicate using Diameter protocols. In an exemplary embodiment, the accounting nodes 416 and 418 can monitor the number of bits transmitted to and from the wireless device over the first network 401 and the second network 403 for numerous purposes such as resource management, load balancing, billing, etc. Alternatively, data usage determination can comprise a session start time, a session stop time, session duration, and/or the number of bits and/or packets transferred over the network to and from the wireless device.

Controller nodes 408 and 410, gateways 412 and 414, and accounting nodes 416 and 418 can comprise a processor and associated circuitry to execute or direct the execution of computer-readable instructions to obtain information. Controller nodes 408 and 410, gateways 412 and 414, and accounting nodes 416 and 418 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller nodes 408 and 410, gateways 412 and 414, and accounting nodes 416 and 418 can receive instructions and other input at a user interface.

Figure 5:
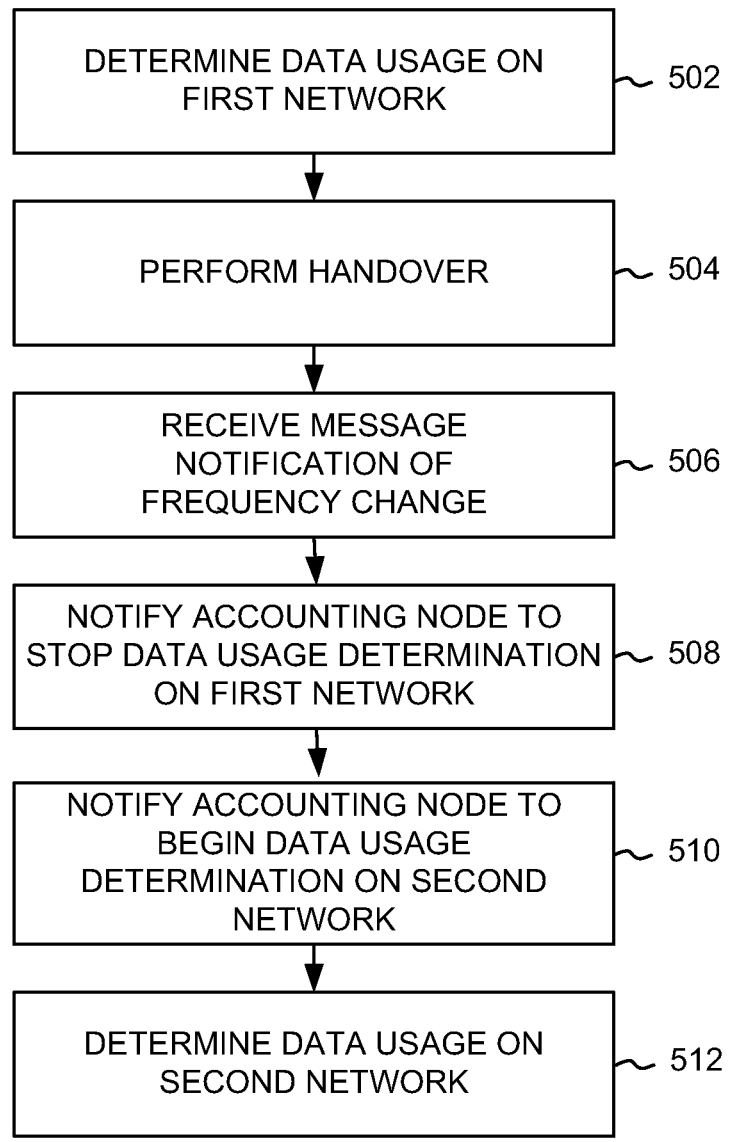
FIG. 5 illustrates another exemplary method to determine wireless data usage.
Figure 6:
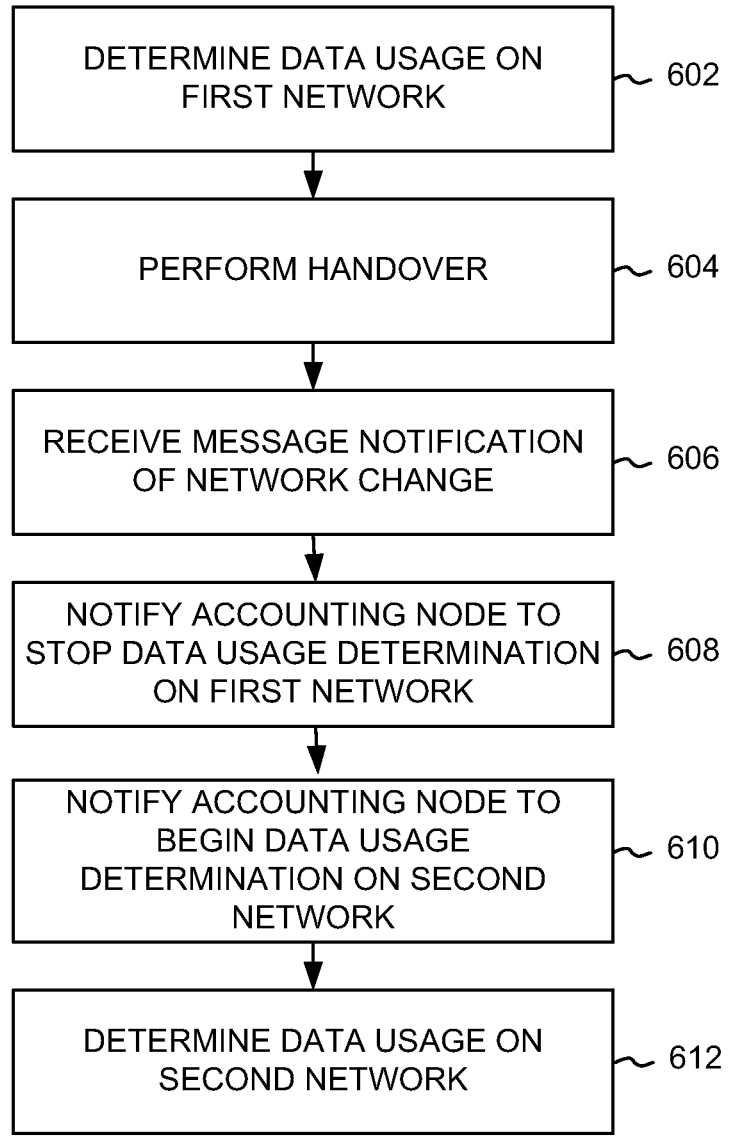
FIG. 6 illustrates another exemplary method to determine wireless data usage.
Figure 7:
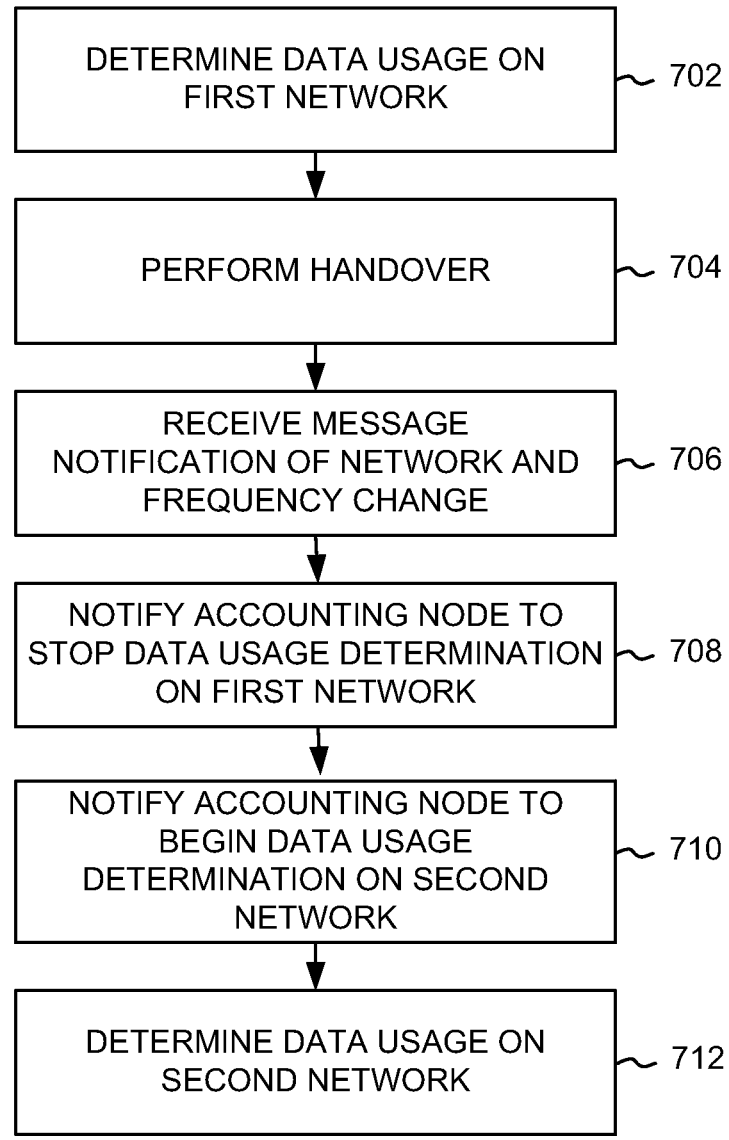
FIG. 7 illustrates another exemplary method to determine wireless data usage.

FIGS. 5-7 illustrate flow charts of exemplary methods of determining wireless data usage. The methods will be discussed with reference to the exemplary communication systems 300 and 400 illustrated in FIGS. 3 and 4. However, the methods can be implemented with any suitable communication system. In addition, although FIGS. 5-7 depict steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined and/or adapted in various ways.

As illustrated in FIG. 5, a wireless device communicates information over a first network of a first network operator. The data transmitted and received by the wireless device can be determined by an accounting node at 502. For example, as illustrated in FIG. 3, wireless device 302 can communicate with access node 304 over a first network 301 of a first network operator through communication link 320.

The data usage can be determined in various ways using various factors. For example, an accounting node can monitor the number of bits of data communicated to or from the wireless device over the first network. In an exemplary embodiment, data usage determination can comprise a session start time, a session stop time, session duration, and/or the number of bits and/or packets transferred over the network to and/or from the wireless device. When start time, stop time, and interim messages are used during data usage determination, a message indicative of a start time can be used to trigger a data usage determination session. A stop time message can terminate the data usage determination session. An interim message can be indicative of maintaining the current data determination state such that if data determination is currently occurring, it will continue to be determined. Likewise, if no data determination is being determined than data usage determination will not be initiated.

In addition, accounting determinations can be made using various methods or protocols. For example, the Diameter protocol can be used to provide real-time delivery of accounting information. In an embodiment, accounting node 312 can monitor and determine data usage of wireless device 302 over the first network 301. In an alternative embodiment, controller node 308 can monitor data usage of the wireless device 302 and can send information indicative of the data usage to the accounting node 312 such that the accounting node 312 can determine the data usage of the wireless device 302 over the first network 301.

A handover of the wireless device can be performed at 504 from the first network to the second network. The handover can be initiated by any device in the network. For example, access node 304 can communicate with access node 306 and decide to handover the wireless device 302 to access node 306 the second network 303.

Following the handover, a controller node can receive a notification message of a frequency change at 506 where the notification is indicative of a change in network and/or a network operator. For example, wireless device 302 can generate a notification message, such as a PLMN-ID message to be sent to the controller node 308 or access node 304 can generate the notification message, such as an ECGI message, to be sent to the controller node 308.

In an exemplary embodiment, as illustrated in FIG. 4, when a handover of wireless device 402 is performed from the first network 401 to the second network 403, controller node 408, and/or controller node 410 can receive the notification of a change in frequency. Controller node 408 can receive a notification of a change in frequency indicative of wireless device 402 no longer communicating over the first network 401. Alternatively or in addition to the notification of change in frequency communicated to controller node 408, controller node 410 can receive a notification of a change in frequency indicative of wireless device 402 initiating communications over the second network. Likewise, the notification of a change in frequency can be initiated when a handover of the wireless device 402 is performed from the second network 403 to the first network 401.

The notification message can be indicative of a change in networks, where the networks have different network operators. The message can include any information that can be used to identify a change in networks based on a change in frequency. For example, the message can include information associated with a first frequency band and/or a second frequency band. For instance, a first frequency band can be associated with a first network operator and a second frequency band can be associated with a second network operator. When the controller node receives the network message comprising frequency band information, the controller node can identify which network operator corresponds to the network the wireless device is communicating over to initiate data usage determination.

The message can include any information and have any format. The change in network message can include only information regarding the change in frequency or the message can include information where the change in frequency is a portion of the information. In addition to frequency information, the change in network message can include information associated with the wireless device, the first network, and/or the second network. For example, the message can indicate that the wireless device is in a power-on, power-off, or periodic state. The message can further include unique identifiers to allow a controller node or the gateway to determine various attributes of the wireless device such as location, original network operator, current network operator, original frequency band, and/or current frequency band. In an exemplary embodiment, the message can be a PLMN-ID message generated by the wireless device or an ECGI message comprising a PLMN-ID generated by an access node.

The notification of frequency change message can be sent separate from any tracking area update procedure. Tracking area update messages may not be reliable for determining changes in data usage from one network to another because the tracking area update procedure may not contemplate all transitions from one network to another. For example, a handover of the wireless device can be performed without triggering a tracking area update procedure, such as when the wireless device is handed over between different frequency bands.

In addition, the message indicative of a notification of a change in frequency is different from conventional roaming messages. In a conventional roaming scenario, a controller node, gateway, and/or accounting node of a first network operator communicates data usage of a wireless device to controller node, gateway, and/or accounting node of a second network operator over a communication network generally after usage already occurs. In an exemplary embodiment of the present disclosure, the notification of a change in frequency can be a trigger for the network to initiate a dynamic data usage determination no matter which network the wireless device is communicating over. For example, data usage can be determined by an accounting node of the first network when the wireless device is communicating over the first network and the second network.

The notification of a change in frequency can trigger the determination of data usage over the respective networks. An accounting node can be notified to stop data usage determination on the first network at 508 and an accounting node can be notified to begin data usage determination on the second network at 510. For example, when controller node 408 and/or 410 receives the notification of change in frequency message, the controller node 408 and/or 410 can generate an accounting message to send to accounting node 416 and/or 418. In an exemplary embodiment, the controller node 408 and/or 410 can generate a start, stop, and/or interim message and send the accounting message to accounting node 416 and/or 418. When start time, stop time, and interim messages are used during data usage determination, a message indicative of a start time can be used to trigger a data usage determination session. A stop time message can terminate the data usage determination session. An interim message can be indicative of maintaining the current data determination state such that if data determination is currently occurring, it will continue to be determined. Likewise, if no data determination is being determined than data usage determination will not be initiated. The accounting notifications can be transmitted simultaneously or sequentially.

After an accounting node is notified to stop data usage determination on a first network at 508 and an accounting node is notified to begin data usage determination on the second network at 510, the accounting node can determine data usage on the second network at 512. The data usage can be determined in various ways. For example, the accounting node can monitor the number of bits of data communicated to or from the wireless device over the first network. In addition, accounting determinations can be made using various methods or protocols. For example, the Diameter protocol can be used to provide real-time delivery of accounting information.

In an exemplary embodiment, as illustrated in FIG. 3, accounting node 312 can monitor and determine data usage of wireless device 302 over the second network 303. In an alternative exemplary embodiment, controller node 308 can monitor data usage of the wireless device 302 and can send information indicative of the data usage to the accounting node 312 such that the accounting node 312 can determine the data usage of the wireless device 302 over the second network 303.

As illustrated in FIG. 6, a wireless device communicates information over a first network of a first network operator. The data transmitted and received by the wireless device over the first network can be determined by an accounting node at 602. For example, as illustrated in FIG. 3, wireless device 302 can communicate with access node 304 over a first network 301 of a first network operator through communication link 320.

The data usage can be determined in various ways using various factors. For example, an accounting node can monitor the number of bits of data communicated to or from the wireless device over the first network. In an exemplary embodiment, data usage determination can comprise a session start time, a session stop time, session duration, and/or the number of bits and/or packets transferred over the network to and/or from the wireless device. When start time, stop time, and interim messages are used during data usage determination, a message indicative of a start time can be used to trigger a data usage determination session. A stop time message can terminate the data usage determination session. An interim message can be indicative of maintaining the current data determination state such that if data determination is currently occurring, it will continue to be determined. Likewise, if no data determination is being determined than data usage determination will not be initiated.

In addition, accounting determinations can be made using various methods or protocols. For example, the Diameter protocol can be used to provide real-time delivery of accounting information. In an embodiment, accounting node 312 can monitor and determine data usage of wireless device 302 over the first network 301. In an alternative embodiment, controller node 308 can monitor data usage of the wireless device 302 and can send information indicative of the data usage to the accounting node 312 such that the accounting node 312 can determine the data usage of the wireless device 302 over the first network 301.

A handover of the wireless device can be performed at 604 from the first network to the second network. The handover can be initiated by any device in the network. For example, access node 304 can communicate with access node 306 and decide to handover the wireless device 302 to access node 306 the second network 303.

Following the handover, a controller node can receive a notification message of a network change at 606 where the notification is indicative of a change in network and/or a network operator. For example, wireless device 302 can generate a notification message, such as a PLMN-ID message to be sent to the controller node 308 or access node 304 can generate the notification message, such as an ECGI message, to be sent to the controller node 308.

In an exemplary embodiment, as illustrated in FIG. 4, when a handover of wireless device 402 is performed from the first network 401 to the second network 403, controller node 408, and/or controller node 410 can receive the notification of a change in network. Controller node 408 can receive a notification of a change in network indicative of wireless device 402 no longer communicating over the first network 401. Alternatively or in addition to the notification of change in network communicated to controller node 408, controller node 410 can receive a notification of a change in network indicative of wireless device 402 initiating communications over the second network. Likewise, the notification of a change in network can be initiated when a handover of the wireless device 402 is performed from the second network 403 to the first network 401.

The notification message can be indicative of a change in networks, where the networks have different network operators. The message can include any information that can be used to identify a network. For example, the message can include information associated with a first network identifier and/or a second network identifier. For instance, a first network identifier can be associated with a first network operator and a second network identifier can be associated with a second network operator. When the controller node receives the network message comprising network information, the controller node can identify which network operator corresponds to the network the wireless device is communicating over to initiate data usage determination.

The change in network message can include any information and have any format. The message can include only information regarding the change in network or the message can include information where the change in network is a portion of the information. In addition to network information, the change in network message can include information associated with the wireless device, the first network, the second network and/or frequency band information. For example, the message can indicate that the wireless device is in a power-on, power-off, or periodic state. The message can further include unique identifiers to allow a controller node or the gateway to determine various attributes of the wireless device such as location, original network operator, current network operator, original frequency band, and/or current frequency band. In an exemplary embodiment, the message can be a PLMN-ID message generated by the wireless device or an ECGI message comprising a PLMN-ID generated by an access node.

The notification of network change message can be sent separate from any tracking area update procedure. Tracking area update messages may not be reliable for determining changes in data usage from one network to another because the tracking area update procedure may not contemplate all transitions from one network to another. For example, a handover of the wireless device can be performed without triggering a tracking area update procedure, such as when the wireless device is handed over between different frequency bands.

In addition, the message indicative of a notification of a change in network is different from conventional roaming messages. In a conventional roaming scenario, a controller node, gateway, and/or accounting node of a first network operator communicates data usage of a wireless device to controller node, gateway, and/or accounting node of a second network operator over a communication network generally after usage already occurs. In an exemplary embodiment of the present disclosure, the notification of a change in network can be a trigger for the network to initiate a dynamic data usage determination no matter which network the wireless device is communicating over. For example, data usage can be determined by an accounting node of the first network when the wireless device is communicating over the first network and the second network.

The notification of a change in network can trigger the determination of data usage over the respective networks. An accounting node can be notified to stop data usage determination on the first network at 608 and an accounting node can be notified to begin data usage determination on the second network at 610. For example, when controller node 408 and/or 410 receives the notification of change in network message, the controller node 408 and/or 410 can generate an accounting message to send to accounting node 416 and/or 418. In an exemplary embodiment, the controller node 408 and/or 410 can generate a start, stop, and/or interim message and send the accounting message to accounting node 416 and/or 418. When start time, stop time, and interim messages are used during data usage determination, a message indicative of a start time can be used to trigger a data usage determination session. A stop time message can terminate the data usage determination session. An interim message can be indicative of maintaining the current data determination state such that if data determination is currently occurring, it will continue to be determined. Likewise, if no data determination is being determined than data usage determination will not be initiated. The accounting notifications can be transmitted simultaneously or sequentially.

After an accounting node is notified to stop data usage determination on a first network at 608 and an accounting node is notified to begin data usage determination on the second network at 610, the accounting node can determine data usage on the second network at 612. The data usage can be determined in various ways using various methods and protocols. For example, the accounting node can monitor the number of bits of data communicated to or from the wireless device over the first network. In addition, the Diameter protocol can be used to provide real-time delivery of accounting information.

In an exemplary embodiment, as illustrated in FIG. 3, accounting node 312 can monitor and determine data usage of wireless device 302 over the second network 303. In an alternative exemplary embodiment, controller node 308 can monitor data usage of the wireless device 302 and can send information indicative of the data usage to the accounting node 312 such that the accounting node 312 can determine the data usage of the wireless device 302 over the second network 303.

As illustrated in FIG. 7, a wireless device communicates information over a first network of a first network operator. The data transmitted and received by the wireless device over the first network can be determined by an accounting node at 702. For example, as illustrated in FIG. 3, wireless device 302 can communicate with access node 304 over a first network 301 of a first network operator through communication link 320.

The data usage can be determined in various ways using various factors. For example, an accounting node can monitor the number of bits of data communicated to or from the wireless device over the first network. In an exemplary embodiment, data usage determination can comprise a session start time, a session stop time, session duration, and/or the number of bits and/or packets transferred over the network to and/or from the wireless device. When start time, stop time, and interim messages are used during data usage determination, a message indicative of a start time can be used to trigger a data usage determination session. A stop time message can terminate the data usage determination session. An interim message can be indicative of maintaining the current data determination state such that if data determination is currently occurring, it will continue to be determined. Likewise, if no data determination is being determined than data usage determination will not be initiated.

In addition, accounting determinations can be made using various methods or protocols. For example, the Diameter protocol can be used to provide real-time delivery of accounting information. In an embodiment, accounting node 312 can monitor and determine data usage of wireless device 302 over the first network 301. In an alternative embodiment, controller node 308 can monitor data usage of the wireless device 302 and can send information indicative of the data usage to the accounting node 312 such that the accounting node 312 can determine the data usage of the wireless device 302 over the first network 301.

A handover of the wireless device can be performed at 704 from the first network to the second network. The handover can be initiated by any device in the network. For example, access node 304 can communicate with access node 306 and decide to handover the wireless device 302 to access node 306 the second network 303.

Following the handover, a controller node can receive a notification message of a change in network and frequency at 706 where the notification is indicative of a network and/or a network operator. For example, wireless device 302 can generate a notification message, such as a PLMN-ID message to be sent to the controller node 308 or access node 304 can generate the notification message, such as an ECGI message, to be sent to the controller node 308.

In an exemplary embodiment, as illustrated in FIG. 4, when a handover of wireless device 402 is performed from the first network 401 to the second network 403, controller node 408, and/or controller node 410 can receive the notification of a change in frequency. Controller node 408 can receive a notification of a change in frequency indicative of wireless device 402 no longer communicating over the first network 401. Alternatively or in addition to the notification of change in frequency communicated to controller node 408, controller node 410 can receive a notification of a change in frequency indicative of wireless device 402 initiating communications over the second network. Likewise, the notification of a change in frequency can be initiated when a handover of the wireless device 402 is performed from the second network 403 to the first network 401.

The notification message can be indicative of a change in network and frequency, where the networks have different network operators. The message can include any information that can be used to identify a change in networks based on a change in networks and a change frequency. For example, the message can include information associated with a first network identifier, a second network identifier, first frequency band, and/or a second frequency band. For instance, a first frequency band can be associated with a first network operator, a second frequency band can be associated with the first network operator, and a second frequency band can also be associated with a second network operator. When the controller node receives the network message comprising network information and frequency band information, the controller node can use network identifier information in combination with the frequency information to identify which network operator corresponds to the network the wireless device is communicating over to initiate data usage determination.

The message can include any information and have any format. The change in network message can include information regarding the change in frequency and the network or the message can include information where the change in frequency and the network is a portion of the information. The change in network message can include information associated with the wireless device, the first network, and/or the second network. For example, the message can indicate that the wireless device is in a power-on, power-off, or periodic state. The message can further include unique identifiers to allow a controller node or the gateway to determine various attributes of the wireless device such as location, original network operator, current network operator, original frequency band, and/or current frequency band. In an exemplary embodiment, the message can be a PLMN-ID message generated by the wireless device or an ECGI message comprising a PLMN-ID generated by an access node.

The notification of network and frequency change message can be sent separate from any tracking area update procedure. Tracking area updates may not be reliable for determining changes in data usage from one network to another because the tracking area update procedure may not contemplate all transitions from one network to another. For example, a handover of the wireless device can be performed without triggering a tracking area update procedure, such as when the wireless device is handed over between different frequency bands In addition, the message indicative of a notification of a change in network and frequency is different from conventional roaming messages. In a conventional roaming scenario, a controller node, gateway, and/or accounting node of a first network operator communicates data usage of a wireless device to controller node, gateway, and/or accounting node of a second network operator over a communication network generally after usage already occurs. In an exemplary embodiment of the present disclosure, the notification of a change in network and frequency can be a trigger for the network to initiate a dynamic data usage determination no matter which network the wireless device is communicating over. For example, data usage can be determined by an accounting node of the first network when the wireless device is communicating over the first network and the second network.

Figure 8:
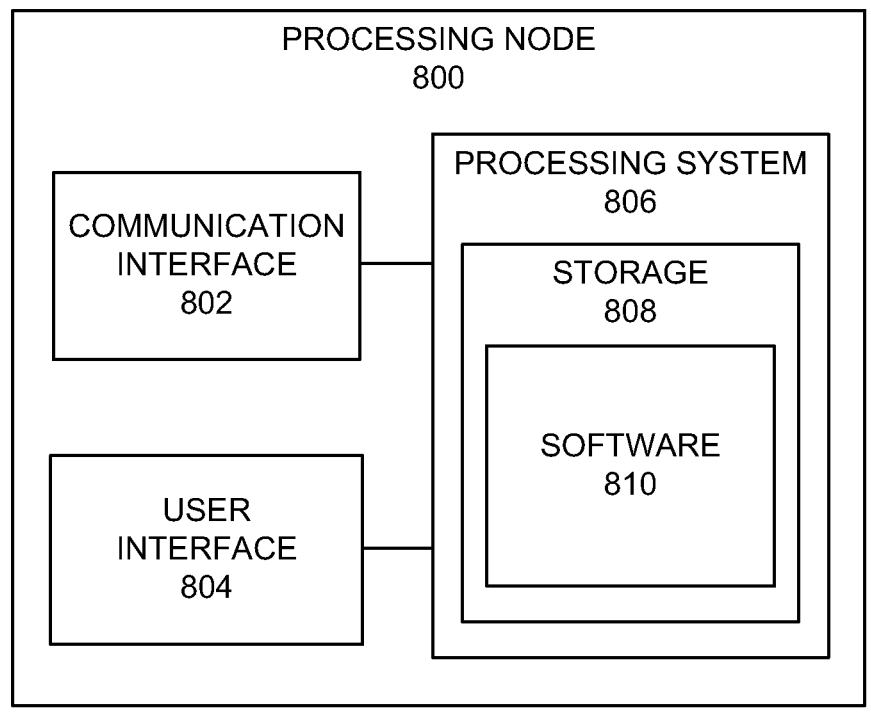
FIG. 8 illustrates an exemplary processing node.

FIG. 8 illustrates an exemplary processing node 800 in a communication system. Processing node 800 comprises communication interface 802, user interface 804, and processing system 806 in communication with communication interface 802 and user interface 804. Processing node 800 is capable of determining data usage of a wireless device. Processing system 806 includes storage 808, which can comprise a disk drive, flash drive, memory circuitry, or other memory device. Storage 808 can store software 810 which is used in the operation of the processing node 800. Storage 808 may include a disk drive, flash drive, data storage circuitry, or some other memory apparatus. Software 810 may include computer programs, firmware, or some other form of machine-readable instructions, including an operating system, utilities, drivers, network interfaces, applications, or some other type of software. Processing system 806 may include a microprocessor and other circuitry to retrieve and execute software 810 from storage 808. Processing node 800 may further include other components such as a power management unit, a control interface unit, etc., which are omitted for clarity. Communication interface 802 permits processing node 800 to communicate with other network elements. User interface 804 permits the configuration and control of the operation of processing node 800.

Examples of processing node 800 include controller nodes 106, 108, 308, 310, 408, and 410, gateways 310, 412, 414, accounting nodes 312, 416, 418, network node 314, and wireless devices 102 and 302. Processing node can also be an adjunct or component of a network element, such as an element of access node 104, access node 304 or access node 303. Processing node 800 can also be another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

The invention claimed is:

1. A method of determining wireless data usage, comprising:

determining, by a controller node of the first network, the wireless data usage of a wireless device on a first network of a first network operator, wherein the wireless device communicates using with first network over a first frequency band;

receiving a message that indicates a frequency band change from the first frequency band to a second frequency band for the wireless device; and determining, by the controller node of the first network, the wireless data usage of the wireless device on the second network based on the frequency band change for the wireless device, wherein the message indicating that the wireless device is communicating using the second frequency band triggers the data usage determination of the wireless device on the second network and terminates the data usage determination of the wireless device on the first network.

2. The method of claim 1, wherein the message is generated at the wireless device.

3. The method of claim 1, wherein the message is generated at an access node in communication with the wireless device.

4. The method of claim 1, wherein the message further indicates a performance of a handover from the first frequency band of the first network to the second frequency band of the second network.

5. The method of claim 4, wherein the first frequency band of the first network is different from the second frequency band of the second network.

6. The method of claim 1, wherein the message indicating the performance of the handover comprises information associated with the first network operator and the second network operator.

7. The method of claim 1, wherein the message indicating the performance of the handover comprises at least one of a public land mobile network identifier (PLMN-ID) or an E-UTRAN cell global identifier (ECGI).

8. The method of claim 1, wherein the controller node triggers the data usage determination of the wireless device on the second network based on an association between the second frequency band and the second network.

9. The method of claim 1, wherein determining the wireless data usage of a wireless device on a first network of a first network operator comprises monitoring bits communicated to and from the wireless device over the first network.

10. The method of claim 1, wherein determining the wireless data usage of the wireless device on the second network based on the message received comprises monitoring bits communicated to and from the wireless device over the second network after receiving the message indicating the performance of a handover.

11. A method of determining wireless data usage, comprising:

determining, at a controller node, the wireless data usage of a wireless device on a first network of a first network operator, wherein the wireless device communicates using with first network over a first frequency band;

receiving, at the controller node, a message that indicates a frequency band change from the first frequency band to a second frequency band for the wireless device, wherein the message comprises information associated with a second network operator; and determining, at the controller node, the wireless data usage of the wireless device on the second network based on the information associated with the second network operator, wherein the message indicating that the wireless device is communicating using the second frequency band triggers the data usage determination of the wireless device on the second network and terminates the data usage determination of the wireless device on the first network.

12. The method as in claim 11, wherein the message further indicates a performance of a handover from a first frequency band of the first network to the second frequency band of the second network, where the first frequency band is different from the second frequency band.

13. The method as in claim 11, wherein the message further comprises information associated with the first network operator.

14. The method as in claim 11, wherein the message indicating the performance of the handover comprises a public land mobile network identifier (PLMN-ID) sent from the wireless device.

15. The method as in claim 11, wherein the message indicating the performance of the handover comprises an E-UTRAN cell global identifier (ECGI) sent from an access node in communication with the wireless device.

16. A communication system, comprising:

a processing node associated with a first network, the processing node being configured to:

determine the wireless data usage of a wireless device on the first network of a first network operator, wherein the wireless device communicates with the first network over a first frequency band;

receive a message that indicates a frequency band change for the wireless device; and determine the wireless data usage of the wireless device on the second network based on the frequency band change for the wireless device, wherein the message indicating that the wireless device is communicating using the second frequency band triggers the data usage determination of the wireless device on the second network and terminates the data usage determination of the wireless device on the first network.

17. The communication system of claim 16, wherein the message is received from the wireless device or an access node in communication with the wireless device.

18. The communication system of claim 16, wherein the message comprises information associated with the first network operator and the second network operator.

19. The communication system of claim 16, wherein the message comprises a public land mobile network identifier (PLMN-ID) or an E-UTRAN cell global identifier (ECGI).

20. The communication system of claim 16, wherein the processing node is a controller node.

* * * * *